(12) United States Patent
Naito

(10) Patent No.: US 7,355,842 B2
(45) Date of Patent: Apr. 8, 2008

(54) CHIP SOLID ELECTROLYTE CAPACITOR AND PRODUCTION METHOD OF THE SAME

(75) Inventor: Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/568,713

(22) PCT Filed: Aug. 19, 2004

(86) PCT No.: PCT/JP2004/012228

§ 371 (c)(1),
(2), (4) Date: Feb. 17, 2006

(87) PCT Pub. No.: WO2005/020258

PCT Pub. Date: Mar. 3, 2005

(65) Prior Publication Data

US 2006/0221556 A1    Oct. 5, 2006

Related U.S. Application Data

(60) Provisional application No. 60/498,596, filed on Aug. 29, 2003.

(30) Foreign Application Priority Data

Aug. 20, 2003  (JP)  ............................. 2003-296276

(51) Int. Cl.
*H01G 4/228*  (2006.01)
*H01G 9/00*  (2006.01)

(52) U.S. Cl. ...................... 361/540; 361/538; 29/25.03

(58) Field of Classification Search ........ 361/538–539, 361/540, 533, 535, 528–529; 29/25.03
See application file for complete search history.

(56) References Cited

U.S. PATENT DOCUMENTS

| | | | | |
|---|---|---|---|---|
| 3,588,629 A | * | 6/1971 | Millard et al. .............. | 361/540 |
| 4,757,423 A | * | 7/1988 | Franklin .................. | 361/275.4 |
| 6,185,090 B1 | * | 2/2001 | Pozdeev-Freeman ........ | 361/524 |
| 2002/0163775 A1 | * | 11/2002 | Maeda ........................ | 361/528 |
| 2007/0002526 A1 | * | 1/2007 | Naito .......................... | 361/523 |

FOREIGN PATENT DOCUMENTS

| | | | |
|---|---|---|---|
| DE | 2509856 A | * | 9/1976 |
| JP | 60-37114 A | | 2/1985 |
| JP | 3-6808 A | | 1/1991 |
| JP | 5-343272 A | | 12/1993 |
| JP | 7-66901 B2 | | 7/1995 |

(Continued)

*Primary Examiner*—Eric Thomas
(74) *Attorney, Agent, or Firm*—Sughrue Mion, PLLC

(57) ABSTRACT

The present invention relates to a chip solid electrolyte capacitor obtained by connecting a part of the anode part and a part of the cathode part of a capacitor element to an anode terminal and a cathode terminal, respectively, and jacket-molding the capacitor element excluding a part or the whole of respective bottom faces or bottom and side faces of the anode and cathode terminals, wherein the connection face of the cathode terminal to the capacitor element is larger than the entire face of the capacitor element in the side connected to the cathode terminal, having large capacitance and low equivalent series resistance (ESR); a production method of the capacitor and an electronic device using the capacitor.

24 Claims, 3 Drawing Sheets

FOREIGN PATENT DOCUMENTS

| | | |
|---|---|---|
| JP | 8-148386 A | 6/1996 |
| JP | 2000-323357 A | 11/2000 |
| JP | 2001244145 A * | 9/2001 |
| JP | 2002-367862 A | 12/2002 |
| JP | 2003-68576 A | 3/2003 |
| JP | 2003-133177 A | 5/2003 |
| JP | 2003-142337 A | 5/2003 |

* cited by examiner

CHIP SOLID ELECTROLYTE CAPACITOR AND PRODUCTION METHOD OF THE SAME

CROSS REFERENCE TO THE RELATED APPLICATIONS

This is an application filed pursuant to 35 U.S.C. Section 111(a) with claiming the benefit of U.S. Provisional application Ser. No. 60/498,596 filed Aug. 29, 2003 under the provision of 35 U.S.C. Section 111(b), pursuant to 35 U.S.C. Section 119(e)(1).

TECHNICAL FIELD

The present invention relates to a chip solid electrolyte capacitor having good properties such as large capacitance per unit volume and low equivalent series resistance (ESR) and a production method of the same.

BACKGROUND ART

A capacitor in the periphery of central processing unit (CPU) used for personal computers and the like is required to have high capacitance and low ESR so as to suppress the fluctuation of voltage and reduce the heat generation at the passing of a high ripple current. As such a capacitor, a chip aluminum solid electrolyte capacitor and a chip tantalum solid electrolyte capacitor are known.

The chip solid electrolyte capacitor is manufactured by producing a solid electrolyte capacitor element where an oxide dielectric film layer, a semiconductor layer and an electrically conducting layer are sequentially stacked to form a cathode part on a surface excluding the anode part at one end of an anode substrate comprising a valve-acting metal foil having fine pores in the surface layer, an anode substrate comprising a sintered body having fine pores in the inside, or an anode substrate comprising this sintered body to which a metal wire is connected, connecting a part of the anode part and a part of the cathode part to an anode terminal and a cathode terminal, respectively, and molding the capacitor element with a jacket while partially leaving outside a part of the both anode and cathode terminals.

In recent years, for increasing the capacitance and further reducing the ESR value of such a solid electrolyte capacitor, there is known a technique of disposing the anode and cathode terminals on the bottom face of a chip solid electrolyte capacitor and molding the capacitor with a jacket while leaving outside only bottom faces of the anode and cathode terminals. When the anode and cathode terminals are disposed on the bottom face of a jacket-molded body, it is expected that the capacitance can be increased by providing the anode substrate fully in the jacket-molded body and low ESR can be achieved by minimizing the distance from the anode and cathode terminals to the anode and cathode parts of the capacitor element.

For example, as shown in a schematic view (perspective view) of FIG. 3, a conventionally known chip solid electrolyte capacitor has a structure that a cathode part (3) of a solid electrolyte capacitor element (1) is provided by stacking a semiconductor layer and an electrically conducting layer in this order on a sintered body comprising a valve-acting metal having formed on the surface thereof an oxide dielectric film layer, a part of the cathode part is placed on a cathode terminal (4), a part of the anode lead (2) (anode part) connected to the sintered body is placed on an anode terminal (5), each part is electrically and mechanically connected, and the entirety is sealed with a jacketing resin while leaving outside only respective bottom faces of the anode and cathode terminals (4a, 5a) to form a jacket (6) (see, JP-A-2003-68576 (the term "JP-A" as used herein means an "unexamined published Japanese patent application")) (in FIG. 3, for the sake of clear understanding, each of the anode and cathode terminals is drawn by exaggerating the size). Also, JP-A-8-148386 describes a bottom face electrode utilizing the electrode faces provided on top and bottom faces of a substrate.

DISCLOSURE OF THE INVENTION

Figure 1:
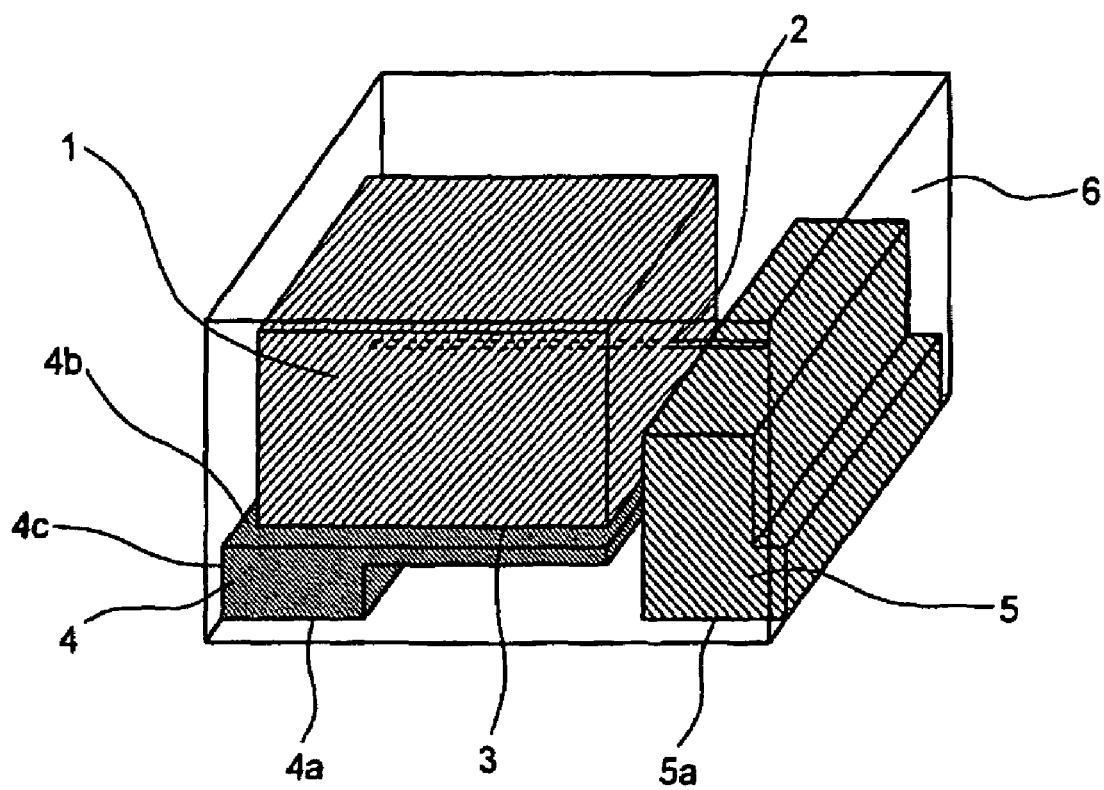
FIG. 1 is a perspective view of a chip solid electrolyte capacitor or the present invention, showing the state where a part of the anode part and a part of the cathode part of a solid electrolyte capacitor element having an anode lead (anode part) are laid on each of the anode and cathode terminals.

In the method of JP-A-2003-68576 publication, the entire bottom face of the cathode layer of the capacitor element is not connected to a cathode terminal and therefore, the ESR value cannot be decreased. Also, in the method of JP-A-8-148386 publication, an electrically conducting member crossing from the top face to the bottom face of the substrate is necessary and this is disadvantageous not only in that a low ESR value cannot be achieved but also in that due to a large thickness of the substrate, the capacitor element proportionally decreases in the size and the capacitance cannot be increased. Accordingly, a chip solid electrolyte capacitor more improved in the ESR and further increased in the capacitance has been demanded.

As a result of intensive investigations to satisfy such a demand, the present inventors have found that those problems can be solved by improving the shape of a terminal. The present invention has been accomplished based on this finding.

That is, the present invention relates to a chip solid electrolyte capacitor, a production method of the same and electronic devices using the chip solid electrolyte capacitor, which are described below.

1. A chip solid electrolyte capacitor obtained by connecting a part of the anode part and a part of the cathode part of a capacitor element to an anode terminal and a cathode terminal, respectively, and jacket-molding the capacitor element excluding a part or the whole of respective bottom faces or bottom and side faces of the anode and cathode terminals, wherein the connection face of the cathode terminal to the capacitor element is larger than the entire face of the capacitor element in the side connected to the cathode terminal.

2. The chip solid electrolyte capacitor as described in 1 above, wherein the bottom face part of the cathode terminal and the bottom face part of the anode terminal have nearly the same size.

3. The chip solid electrolyte capacitor as described in 1 or 2 above, wherein the capacitor element is produced by sequentially stacking an oxide dielectric film layer, a semiconductor layer and an electrically conducting layer on a surface of an anode substrate comprising a sintered body of a valve-acting metal or an electrically conducting oxide.

4. The chip solid electrolyte capacitor as described in any of 1 to 3 above, wherein the anode part comprises a distal end of the anode substrate.

5. The chip solid electrolyte capacitor as described in any of 1 to 4 above, wherein the anode part comprises a metal wire or foil connected to the sintered body.

6. The chip solid electrolyte capacitor as described in 5 above, wherein the metal wire is selected from tantalum, niobium, aluminum, titanium, alloys mainly comprising such a metal, and these metals and alloys which are partially oxidized and/or nitrided.

7. The chip solid electrolyte capacitor as described in any of 1 to 6 above, wherein the material for each of the anode and cathode terminals is selected from iron, copper, aluminum and alloys mainly comprising such a metal.

8. The chip solid electrolyte capacitor as described in any of 1 to 7 above, wherein each of the anode and cathode terminals is partially or entirely subjected to plating selected from solder, tin and titanium.

9. The chip solid electrolyte capacitor as described in 7 or 8 above, wherein each of the anode and cathode terminals differs in the material.

10. The chip solid electrolyte capacitor as described in 3 above, wherein the valve-acting metal or electrically conducting oxide is tantalum, aluminum, niobium, titanium, an alloy mainly comprising such a valve-acting metal or niobium oxide, or a mixture of two or more members selected from these valve-acting metals, alloys and electrically conducting oxides.

11. The chip solid electrolyte capacitor as described in 10 above, wherein a part of the valve-acting metal, alloy or electrically conducting compound is subjected to at least one treatment selected from carbidation, phosphation, boronation, nitridation and sulfidation.

12. The chip solid electrolyte capacitor as described in 3 above, wherein the sintered body has a chemically and/or electrically etched surface.

13. The chip solid electrolyte capacitor as described in any of 1 to 12 above, wherein the boundary between the anode part and the part excluding the anode part of the anode substrate is insulated by an insulating resin.

14. The chip solid electrolyte capacitor as described in 3 above, wherein the oxide dielectric layer mainly comprises at least one member selected from $Ta_2O_5$, $Al_2O_3$, $TiO_2$ and $Nb_2O_5$.

15. The chip solid electrolyte capacitor as described in 3 above, wherein the semiconductor layer is at least one member selected from an organic semiconductor layer and an inorganic semiconductor layer.

16. The chip solid electrolyte capacitor as described in 15 above, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

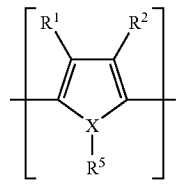

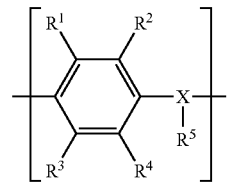

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

17. The chip solid electrolyte capacitor as described in 16 above, wherein the electrically conducting polymer containing a repeating unit represented by formula (1) is an electrically conducting polymer containing a structure unit represented by the following formula (3) as a repeating unit:

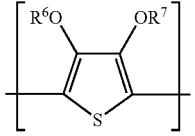

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

18. The chip solid electrolyte capacitor as described in 17 above, wherein the electrically conducting polymer is selected from polyaniline, polyoxyphenylene, polyphenylene sulfide, polythiophene, polyfuran, poly-pyrrole, polymethylpyrrole, and substitution derivatives and copolymers thereof.

19. The chip solid electrolyte capacitor as described in 18 above, wherein the electrically conducting polymer is poly (3,4-ethylenedioxythiophene).

20. The chip solid electrolyte capacitor as described in 15 above, wherein the inorganic semiconductor is at least one compound selected from molybdenum dioxide, tungsten dioxide, lead dioxide and manganese dioxide.

21. The chip solid electrolyte capacitor as described in 3 above, wherein the electrical conductivity of the semiconductor is from $10^{-2}$ to $10^3$ S/cm.

22. A method for producing a chip solid electrolyte capacitor in which a part of the anode part and a part of the cathode part of a capacitor element are connected to an anode terminal and a cathode terminal, respectively, and the capacitor element excluding a part or the whole of respective bottom faces or bottom and side faces of the anode and cathode terminals is molded with a jacket and in which the connection face of the cathode terminal to the capacitor element is larger than the entire face of the capacitor element in the side connected to the cathode terminal, the method comprising using a lead frame pair having bottom face parts working out to a part of the anode terminal and a part of the cathode terminal, and laminating a metal material which constitutes the anode and cathode terminals having an area larger than the cathode terminal-connected face of the capacitor element on the lead frame corresponding to the cathode terminal.

23. A method for producing a chip solid electrolyte capacitor in which a part of the anode part and a part of the cathode part of a capacitor element are connected to an anode terminal and a cathode terminal, respectively, and the capacitor element excluding a part or the whole of respective bottom faces or bottom and side faces of the anode and cathode terminals is molded with a jacket and in which the connection face of the cathode terminal to the capacitor element is larger than the entire face of the capacitor element in the side connected to the cathode terminal and the bottom face parts of the cathode terminal and the anode terminal which are not jacket-molded have nearly the same size, the method comprising using a lead frame pair having nearly the same bottom face parts working out to a part of the anode terminal and a part of the cathode terminal, laminating a metal material which constitutes the anode and cathode terminals having an area larger than the cathode terminal-connected face of the capacitor element on the lead frame corresponding to the cathode terminal, and laminating a metal material constituting the anode terminal connected to the anode part of the capacitor element on the lead frame corresponding to the anode terminal.

24. An electronic circuit using the chip solid electrolyte capacitor described in 1 to 21 above.

25. An electronic device using the chip solid electrolyte capacitor described in 1 to 21 above.

One embodiment of the chip solid electrolyte capacitor of the present invention is described below by referring to the drawings.

Figure 2:
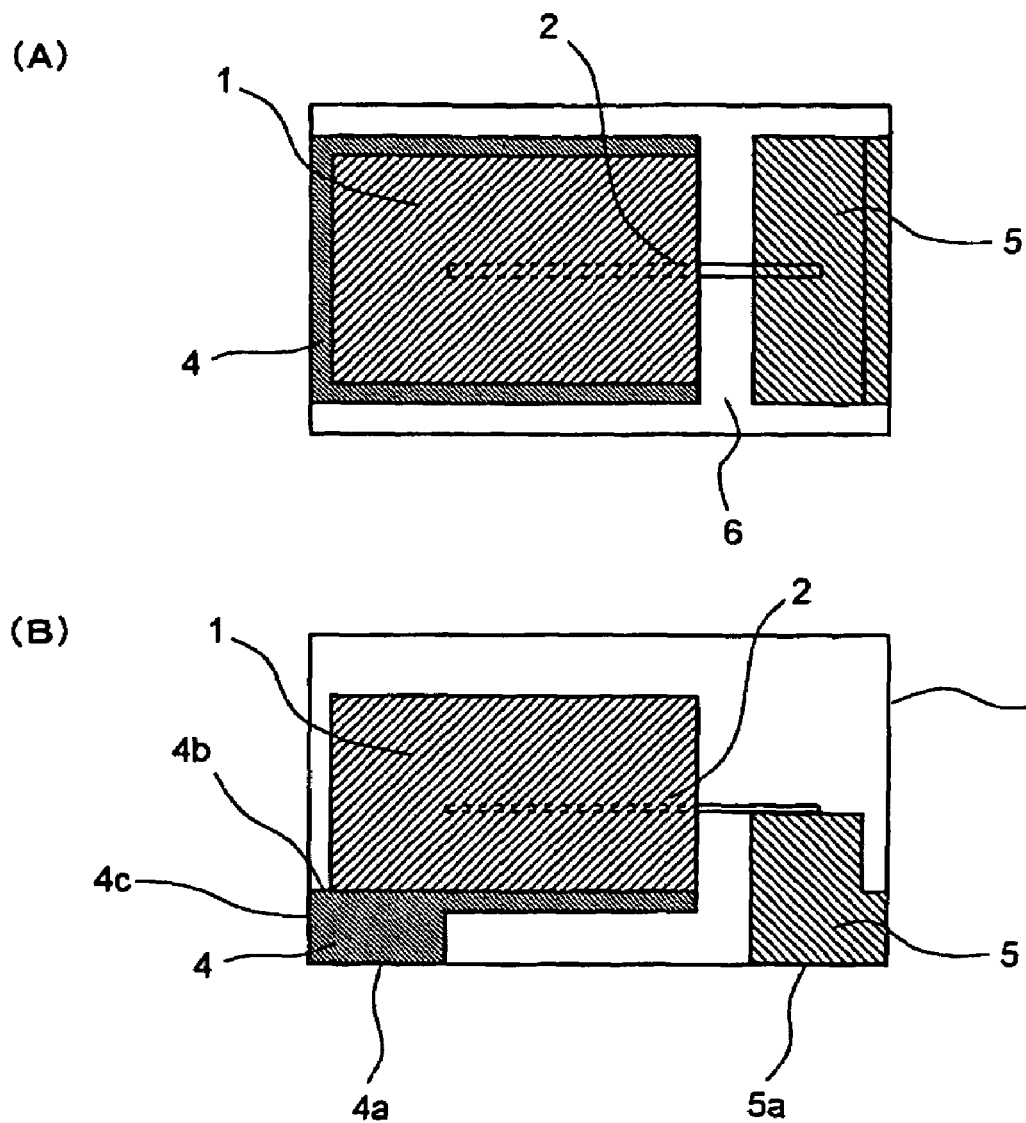
FIG. 2 is a plane cross-sectional view (A) and a side cross-sectional view (B) of the solid electrolyte capacitor of FIG. 1.
Figure 3:
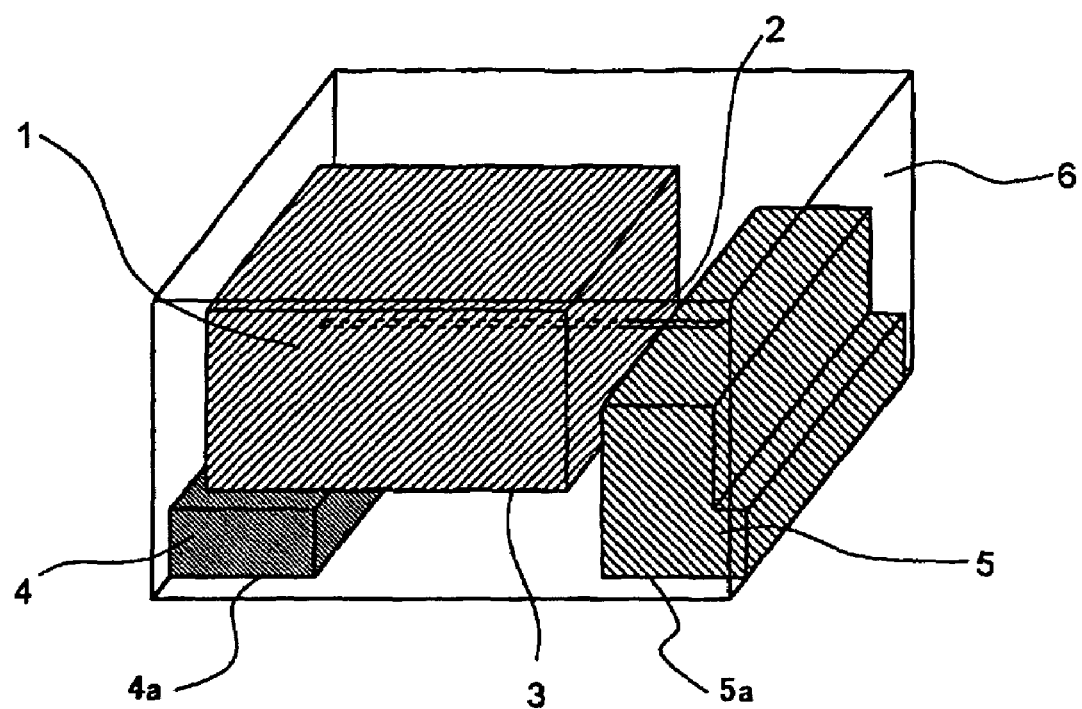
FIG. 3 is a perspective view of a conventional chip solid electrolyte capacitor.

FIG. 1 is a schematic view (perspective view) showing one example of the chip solid electrolyte capacitor of the present invention, FIG. 2(A) is a plane cross-sectional view of FIG. 1 and FIG. 2(B) is a side cross-sectional view (in FIGS. 1 and 2, the portions of both anode and cathode terminals are drawn by exaggerating the size). The chip solid electrolyte capacitor of this example has a structure that a cathode part (3) of a solid electrolyte capacitor element (1) is formed by stacking an oxide dielectric layer, a semiconductor layer and an electrically conducting layer in this order on a surface of an anode substrate comprising a valve-acting metal or an electrically conducting oxide and being connected with an anode lead (2), a part of the cathode part is placed on a cathode terminal (4), a part of the anode part lead (2) is placed on an anode terminal (5), each part is electrically and mechanically connected, and then the capacitor element is jacketed (6) by resin molding while leaving outside bottom faces (4a, 4b) and side face (4c) of the both anode and cathode terminals.

The capacitor element for use in the present invention is produced based on an anode substrate comprising a valve-acting metal or an electrically conducting oxide.

Examples of the valve-acting metal or electrically conducting oxide include tantalum, aluminum, niobium, titanium, an alloy mainly comprising such a valve-acting metal or niobium oxide, and a mixture of two or more members selected from these valve-acting metals, alloys and electrically conducting oxides. The valve-acting metal, alloy, electrically conducting compound or the like may be used after subjecting a part thereof to at least one treatment selected from carbidation, phosphation, boronation, nitridation and sulfidation.

The anode substrate for use in the present invention is a valve-acting metal foil or sheet having fine pores in the surface layer or a sintered body obtained by shaping the powder of valve-acting metal or electrically conducting oxide and then sintering the shaped article. In the case of a sintered body, the surface area of the sintered body can be varied by appropriately selecting the shaping pressure and sintering conditions (temperature and time). After the sintering, the sintered body surface may be chemically and/or electrically etched to further increase the surface area of the sintered body.

In the present invention, a part of the anode substrate is used as an anode part. A distal end of the anode substrate may be assigned to the anode part or as shown in FIG. 1, a metal wire (2) or foil (not shown) may be connected to a part of the anode substrate and used as the anode part. The metal wire (or metal foil) may be connected after the sintered body is produced, or a part of the metal wire (or metal foil) may be embedded at the molding before the production of the sintered body and then sintered, thereby making a connection. Examples of the kind of the metal wire (or metal foil) include tantalum, niobium, aluminum, titanium, alloys mainly comprising such a metal, and these metals and alloys which are partially oxidized and/or nitrided. The diameter of the metal wire is usually 1 mm or less and in the case of a metal foil, the thickness is usually 1 mm or less. For the purpose of preventing the semiconductor layer described later from attaching to the portion serving as the anode part and short-circuiting the capacitor, the anode part and the remaining part of the anode substrate may be insulated by attaching an insulating resin like a hair band to the boundary therebetween before forming the semiconductor layer.

Examples of the oxide dielectric film layer which is formed on the entirety or part of the anode substrate surface excluding the anode part in the present invention include a dielectric layer mainly comprising at least one member selected from metal oxides such as $Ta_2O_5$, $Al_2O_3$, $TiO_2$ and $Nb_2O_5$. The dielectric layer can be obtained by electrochemically forming the anode substrate in an electrolytic solution. Also, a dielectric layer obtained by mixing a dielectric layer mainly comprising at least one member selected from metal oxides and a dielectric layer for use in ceramic capacitors may be used (WO00/75943).

Representative examples of the semiconductor layer which is formed on the dielectric layer in the present invention include at least one compound selected from organic semiconductors and inorganic semiconductors. Specific examples of the organic semiconductors include an organic semiconductor comprising benzopyrroline tetramer and chloranil, an organic semiconductor mainly comprising tetrathiotetracene, an organic semiconductor mainly comprising tetracyanoquinodimethane, and an organic semiconductor mainly comprising an electrically conducting polymer obtained by doping a dopant to a polymer containing a repeating unit represented by the following formula (1) or (2):

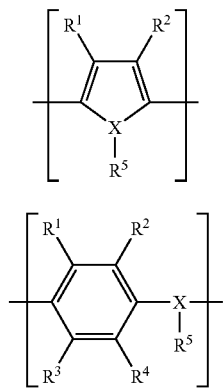

(1)

(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom and represents a hydrogen atom or an alkyl group having from 1 to 6 carbon atoms, and each of the pairs of $R^1$ and $R^2$, and $R^3$ and $R^4$ may combine with each other to form a cyclic structure.

Preferred examples of the electrically conducting polymer containing a repeating unit represented by formula (1) include an electrically conducting polymer containing a structure unit represented by the following formula (3) as a repeating unit:

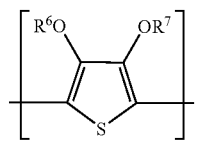

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position. The cyclic structure includes a structure having a vinylene bond which may be substituted, and a phenylene structure which may be substituted.

The electrically conducting polymer containing such a chemical structure is electrically charged and a dopant is doped thereto. For the dopant, known dopants can be used without limitation.

Examples of the polymer containing a repeating unit represented by formula (1), (2) or (3) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

Specific examples of the inorganic semiconductors include at least one compound selected from molybdenum dioxide, tungsten dioxide, lead dioxide and manganese dioxide, etc.

When the organic or inorganic semiconductor used has an electrical conductivity of $10^{-2}$ to $10^3$ S/cm, the capacitor produced can have a small ESR value and this is preferred.

As for the method of forming the semiconductor layer, conventionally known methods such as a method using electrolytic polymerization (see, JP-A-60-37114), method using electrolytic polymerization of an anode substrate treated with an oxidizing agent (see, Japanese Patent No. 2,054,506), and method using chemical deposition (see, Japanese Patent No. 2,044,334) may be employed.

In the present invention, an electrically conducting layer is provided on the semiconductor layer formed by the above-described method or the like. The electrically conducting layer can be formed, for example, by the solidification of electrically conducting paste, plating, vapor deposition of metal, or adhesion of heat-resistant electrically conducting resin film.

Preferred examples of the electrically conducting paste include silver paste, copper paste, aluminum paste, carbon paste and nickel paste, and these may be used individually or in combination of two or more thereof. In the case of using two or more pastes, the pastes may be mixed or may be superposed one on another as separate layers.

The electrically conducting paste applied is then solidified by allowing it to stand in air or under heating. The electrically conducting paste mainly comprises resin and electrically conducting powder such as metal. Depending on the case, a solvent for dissolving the resin or a hardening agent for the resin is added, and the solvent dissipates at the time of solidification.

As for the resin, various known resins are used, such as alkyd resin, acrylic resin, epoxy resin, phenol resin, imide resin, fluororesin, ester resin, imidamide resin, amide resin and styrene resin. As for the electrically conducting powder, at least one member selected from powder of silver, copper, aluminum, gold, carbon, nickel or an alloy mainly comprising such a metal, coated powder having such a metal on the surface layer, and mixed powder thereof is used. The content of the electrically conducting powder is usually from 40 to 97 mass %. If the content is less than 40 mass %, the electrically conducting paste is small in the electrical conductivity, whereas if it exceeds 97 mass %, the electrically conducting paste disadvantageously causes adhesion failure. The electrically conducting paste may be used after mixing thereto powder of the above-described electrically conducting polymer or metal oxide for forming the semiconductor layer.

Examples of the plating include nickel plating, copper plating, silver plating and aluminum plating. Examples of the metal vapor-deposited include aluminum, nickel, copper and silver.

Specifically, for example, an electrically conducting layer is formed by stacking carbon paste and silver paste in this order on the anode substrate having formed thereon the semiconductor layer.

In this way, a solid electrolyte capacitor element where a cathode part is formed by stacking layers up to the electrically conducting layer on the anode substrate is produced.

A part of the anode part and a part of the cathode part of the solid electrolyte capacitor element are connected to an anode terminal and a cathode terminal respectively, which are described later, and thereafter, the capacitor element is sealed with a jacket while leaving outside a part or the whole of the bottom face or bottom and side faces of each terminal, whereby a chip solid electrolyte capacitor is produced.

In the present invention, it is necessary that the top face (the face which actually comes into contact with the capacitor element) of the cathode terminal is the same or larger in the size than the cathode terminal-connected face of the solid electrolyte capacitor element and it is preferable that the bottom face parts of both the anode and cathode terminals have nearly the same size. Here, the term "cathode terminal-connected face of the solid electrolyte capacitor element" means the entire face in the side connected to the cathode terminal out of the faces of the capacitor element in which a cathode layer is formed. By making the size of the top face of the cathode terminal larger than the cathode terminal-connected face of the solid electrolyte capacitor element, the produced solid electrolyte capacitor can have a minimum ESR value. Furthermore, in the present invention, only the sizes of top and bottom faces of the cathode terminal are changed but no extra material of limiting the height of a substrate as in the capacitor of JP-A-8-148386 publication is used and therefore, the size in the height direction of the capacitor element enclosed in the jacket of the chip solid electrolyte capacitor need not be decreased, so that the capacitance of the capacitor can be maximized.

The cathode terminal differing in the shape between top and bottom faces can be produced by working a metal material, but in the case of simultaneously producing a large number of chip solid electrolyte capacitors, the anode and cathode terminals are usually produced from a lead frame comprising a repeated pattern of anode and cathode terminals and after jacketing, cut at predetermined positions to be made into desired shapes. Therefore, in order to facilitate the cutting, for example, a metal having a predetermined shape may be laminated on a flat lead frame having a uniform thickness, so that the lead frame can have a large thickness only in the portions corresponding to the anode and cathode terminals. Also, as a method for producing the thinner part of the lead frame, a method of making the desired part thin by pressing may be used.

As for the material of the anode and cathode terminals, for example, iron, copper, aluminum or an alloy mainly comprising such a metal is used. Each of the anode and cathode terminals may be partially or entirely plated with solder, tin, titanium, silver, gold or the like. Between each of the anode and cathode terminals and the plating, a primer plating such as nickel or copper may be provided. Also, different materials may be used for the anode and cathode terminals so as to cope with the diversification of sound quality when using the produced chip solid electrolyte capacitor for an audio device.

When the bottom face parts of the anode and cathode terminals are made to have nearly the same size, this ensures compatibility with the bottom face part of conventional chip solid electrolyte capacitors and the land shape of a circuit board where the capacitor is mounted need not be changed.

In the present invention, multiple solid electrolyte capacitor elements may be placed on the anode and cathode terminals and in this case, the size of the top face of the cathode terminal may be sufficient if it is larger than the cathode terminal-connected faces of the multiple capacitor elements.

The solid electrolyte capacitor element of the present invention is jacketed, for example, with a resin mold, resin case or metallic jacket case and thereby, can be completed as a capacitor product for various uses.

Among these, a chip solid electrolyte capacitor jacketed with a resin mold is preferred, because reduction in the size and in the cost can be simply achieved.

As for the kind of the resin used for resin mold jacketing, a known resin for use in the molding of a solid electrolyte capacitor, such as epoxy resin, phenol resin and alkyd resin, can be employed. Each resin is preferably a low-stress resin, so that the molding stress on the capacitor element generated at the molding can be mitigated. For the production machine for performing the molding with resin, a transfer machine is preferably used.

The thus-produced solid electrolyte capacitor may be subjected to an aging treatment so as to repair the thermal and/or physical deterioration of the dielectric layer, which is caused at the formation of electrically conducting layer or at the jacketing.

The aging is performed by applying a predetermined voltage (usually, within two times the rated voltage) to the solid electrolyte capacitor. The optimal values of aging time and temperature vary depending on the kind and capacitance of capacitor and the rated voltage and therefore, are determined by previously performing an experiment, but the aging time is usually from several minutes to several days and the aging temperature is usually 300° C. or less by taking account of heat deterioration of the voltage-applying jig. The aging may be performed in an air atmosphere or a gas atmosphere such as argon, nitrogen or helium and may be performed under reduced pressure, atmospheric pressure or applied pressure, but when the aging is performed while supplying water vapor or after water vapor is supplied, the stabilization of a dielectric layer sometimes proceeds. Examples of the method for supplying the water vapor include a method of supplying water vapor from a water reservoir placed in the aging furnace by using the heat.

As for the method of applying a voltage, it can be designed to pass an arbitrary current such as direct current, alternating current having an arbitrary waveform, alternating current superposed on direct current and pulse current.

It is also possible to once stop the voltage application on the way of aging and again apply a voltage.

The chip solid electrolyte capacitor produced in the present invention can be preferably used for circuits requiring a high-capacitance and low ESR capacitor, such as a central processing circuit and a power source circuit. These circuits can be used in various digital devices such as a personal computer, server, camera, game machine, DVD equipment, AV equipment and cellular phone, and electronic devices such as various power sources. The chip solid electrolyte capacitor produced in the present invention has a high capacitance and good ESR performance and therefore, by using this chip solid electrolyte capacitor, electronic circuits and electronic devices having high reliability can be obtained.

EFFECTS OF THE INVENTION

The present invention provides a chip solid electrolyte capacitor in which the connection face of the cathode terminal to the capacitor element is larger than the entire face of the capacitor element in the side connected to the cathode terminal and the bottom face parts of the cathode and anode terminals have nearly the same size and which is obtained by jacket-molding the capacitor element while leaving outside a part of the bottom face or bottom and side faces of the anode and cathode terminals. According to the present invention, a chip solid electrolyte capacitor with large capacitance and good ESR can be obtained.

BEST MODE FOR CARRYING OUT THE INVENTION

EXAMPLES

The present invention is described in greater detail by referring to Examples, however, the present invention is not limited to these Examples.

Example 1 and Comparative Example 1

By using tantalum powder having CV (product of capacitance and electrochemical voltage) of 130,000 μF·V/g, sintered bodies in a size of 4.5×0.95×3.0 mm were produced (sintering temperature: 1,300° C., sintering time: 20 minutes, density of the sintered body: 6.3 g/cm$^3$, Ta lead wire: 0.24 mmϕ; a part of the Ta lead wire was embedded in the sintered body to run in parallel to the longitudinal direction of the 4.5 mm dimension and the lead wire part protruded from the sintered body was used as the anode part). The sintered body to serve as the anode excluding a part of the lead wire was dipped in an aqueous 1% phosphoric acid solution and electrochemically formed at 80° C. for 8 hours by applying a voltage of 9 V between the anode and a Ta plate electrode as the cathode to form an oxide dielectric film layer composed of $Ta_2O_5$. Thereafter, an operation of dipping this sintered body excluding the lead wire in a 1:1 mixed solution of an aqueous 20% lead acetate solution and an aqueous 35% ammonium persulfate solution, allowing it to stand at 40° C. for 1 hour, then pulling out, water-washing and drying the sintered body, and washing it with an aqueous 15% ammonium acetate solution was repeated 35 times to form a semiconductor layer composed of a lead dioxide and lead acetate mixture (lead dioxide: 96%) on the oxide dielectric film layer. On the semiconductor layer, carbon paste and silver paste comprising 10 mass parts of epoxy resin and 90 mass parts of silver powder were sequentially stacked to complete the cathode part, thereby producing a solid electrolyte capacitor element.

On respective top faces of a pair of end parts of a separately prepared 300 μm-thick copper alloy lead frame having a tin-plated surface (32 paired end parts each in a width of 3.4 mm were present; to the end part on which the cathode part was to be laid, a metal strip having a width of 3.4 mm, a length of 5.4 mm and a thickness of 100 μm and being made of the same material as that of the lead frame was welded while aligning the width to protrude 4.0 mm from the distal end; in the end part on which the anode part was to be laid, a metal strip having a width of 3.4 mm, a length of 1.4 mm and a thickness of 500 μm and being made of the same material as that of the lead frame, with one corner being notched to a width of 3.4 mm, a length of 0.4 mm and a thickness of 400 μm, was welded while aligning the width in the unnotched side to come flush with the distal end; the bottom faces of the anode and cathode terminals both had a width of 3.4 mm and a length of 1.4 mm; and when coplanarly projected, a gap of 0.5 mm was present between the pair of the end parts), the cathode part face (face of 4.5 mm×3.0 mm) and anode part of the solid electrolyte capacitor element prepared above were laid and electrically and mechanically connected by solidification of the same silver paste as used in the cathode part for the former and by spot-welding for the latter. Subsequently, the solid electrolyte capacitor was jacketed with epoxy resin by transfer molding while leaving outside all of bottom faces and side faces of the anode and cathode both terminals and the lead frame was cut at a flat part of the lead frame, namely, at the side face of the jacketed body to produce a chip solid electrolyte capacitor in a size of 7.3×4.3×1.8 mm (Example 1).

A chip solid electrolyte capacitor was produced in the same manner as in Example 1 except that in the end part of the lead frame on which the cathode part of the capacitor element was to be laid in Example 1, a metal strip having a width of 3.4 mm, a length of 1.4 mm and a thickness of 100 μm and being made of the same material as that of the lead frame was welded while aligning the width to come flush with the distal end (in this case, when coplanarly projected, a gap of 4.5 mm was present between the pair of the end parts) (Comparative Example 1).

Example 2 and Comparative Example 2

By using 0.048 g of partially nitrided niobium powder (nitrogen amount: 10,000 ppm, total oxygen amount: 91,000 ppm resulting from natural oxidation of the surface) having CV of 220,000 μF·V/g, many sintered bodies in a size of 4.5×0.94×3.0 mm were produced (sintering temperature: 1,280° C., sintering time: 30 minutes, density of sintered body: 3.8 g/cm$^3$, Nb lead wire: 0.24 mmϕ). The sintered body excluding a part of the lead wire was dipped in an aqueous 0.1% phosphoric acid solution and electrochemically formed at 80° C. for 5 hours by applying a voltage of 20 V between the sintered body and a Ta plate electrode used as the negative electrode to form a dielectric layer mainly comprising $Nb_2O_5$. Then, an operation of dipping this sintered body alternately in a 3% 3,4-ethylenedioxythiophene alcohol solution and in an aqueous 13% anthraquinone-2-sulfonic acid solution having dissolved therein 1.5% ammonium persulfate was repeated seven times to attach multiple fine adhering particles mainly comprising ethylenedioxy polymer on the dielectric layer, thereby producing a plurality of fine electrical defective portions in the dielectric layer. According to the observation by a scanning electron microscope (SEM), dot-like fine adhering particles covered about 18% of the dielectric layer. Subsequently, the sintered body was dipped in an electrolytic solution of water and 20% ethylene glycol, where ethylenedioxythiophene (used in the form of an aqueous solution having a monomer concentration lower than the saturated concentration) and anthraquinone-sulfonic acid were dissolved, and for forming a semiconductor layer, a direct current of 30 μA was passed between the anode assigned to the lead wire of the sintered body and a tantalum electrode disposed in the electrolytic solution used as the negative electrode, at room temperature for 45 minutes. The sintered body was then pulled up, washed, dried and subjected to re-electrochemical formation (80° C., 30 minutes, 14 V) in an aqueous 0.1% acetic acid solution to repair the LC-causing defects in the fine electrically defective portions of the dielectric layer. After repeating 15 times the operation of passing the direct current and performing the re-electrochemical formation, the sintered body was washed with water and dried to form a semiconductor layer working as the cathode. On the semiconductor layer, carbon paste and silver paste comprising 10 mass parts of acrylic resin and 90 mass parts of silver powder were sequentially stacked to complete the cathode layer, thereby producing a solid electrolyte capacitor element. Thereafter, chip solid electrolyte capacitors were produced in the same manner as in Example 1 and Comparative Example 1 (capacitors of Example 2 and Comparative Example 2).

With respect to 100 units for each of the chip solid electrolyte capacitors produced above, the capacitance, ESR value and LC value were measured according to the following methods and the results (average value) obtained are shown in Table 1.

Capacitance of Capacitor:

The capacitance was measured at room temperature and 120 Hz by using an LCR measuring meter manufactured by Hewlett Packard.

ESR Value:

The equivalent series resistance of a capacitor was measured at 100 kHz.

LC Value:

After continuously applying a predetermined direct current voltage (2.5 V for Example 1 and Comparative Example 1, and 4 V for Example 2 and Comparative Example 2) between the terminals of the produced capacitor for 30 seconds at room temperature, the LC value was measured.

TABLE 1

|  |  | Capacitance (μF) | ESR (mΩ) | LC (μA) |
|---|---|---|---|---|
| Examples | 1 | 966 | 6 | 18 |
|  | 2 | 433 | 11 | 27 |
| Comparative | 1 | 961 | 9 | 16 |
| Examples | 2 | 425 | 16 | 29 |

As seen from comparison of Example 1 with Comparative Example 1 and comparison of Example 2 with Comparative Example 2, a good ESR value can be obtained when the connection face of the cathode terminal to the capacitor element is larger than the entire face of the capacitor element connected to the cathode terminal.

The invention claimed is:

1. A chip solid electrolyte capacitor obtained by connecting a part of the anode part and a part of the cathode part of a capacitor element to an anode terminal and a cathode terminal, respectively, and jacket-molding the capacitor element excluding only a part or the whole of respective bottom faces or bottom and side faces of the anode and cathode terminals, wherein the connection face of the cathode terminal to the capacitor element is larger than the entire face of the capacitor element in the side connected to the cathode terminal, and wherein the bottom face part of the cathode terminal and the bottom face part of the anode terminal have nearly the same size.

2. The chip solid electrolyte capacitor as claimed in claim 1, wherein the capacitor element is produced by sequentially stacking an oxide dielectric film layer, a semiconductor layer and an electrically conducting layer on a surface of an anode substrate comprising a sintered body of a valve-acting metal or an electrically conducting oxide.

3. The chip solid electrolyte capacitor as claimed in claim 2, wherein the valve-acting metal or electrically conducting oxide is tantalum, aluminum, niobium, titanium, an alloy mainly comprising such a valve-acting metal or niobium oxide, or a mixture of two or more members selected from these valve-acting metals, alloys and electrically conducting oxides.

4. The chip solid electrolyte capacitor as claimed in claim 3, wherein a part of the valve-acting metal, alloy or electrically conducting compound is subjected to at least one treatment selected from carbidation, phosphation, boronation, nitridation and sulfidation.

5. The chip solid electrolyte capacitor as claimed in claim 2, wherein the sintered body has a chemically and/or electrically etched surface.

6. The chip solid electrolyte capacitor as claimed in claim 2, wherein the oxide dielectric layer mainly comprises at least one member selected from $Ta_2O_5$, $Al_2O_3$, $TiO_2$ and $Nb_2O_5$.

7. The chip solid electrolyte capacitor as claimed in claim 2, wherein the semiconductor layer is at least one member selected from an organic semiconductor layer and an inorganic semiconductor layer.

8. The chip solid electrolyte capacitor as claimed in claim 7, wherein the organic semiconductor is at least one member selected from an organic semiconductor comprising benzopyrroline tetramer and chloranil, an organic semiconductor mainly comprising tetrathiotetracene, an organic semiconductor mainly comprising tetracyanoquino-dimethane, and an organic semiconductor mainly comprising an electrically conducting polymer obtained by doping a dopant to a polymer containing a repeating unit represented by the following formula (1) or (2):

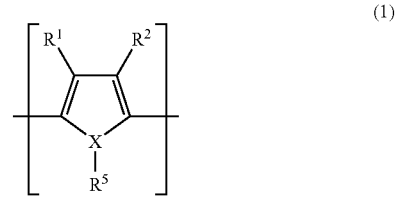

(1)

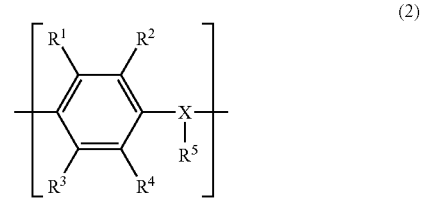

(2)

wherein $R^1$ to $R^4$ each independently represents a hydrogen atom, an alkyl group having from 1 to 6 carbon atoms or an alkoxy group having from 1 to 6 carbon atoms, X represents an oxygen atom, a sulfur atom or a nitrogen atom, $R^5$ is present only when X is a nitrogen atom, and represents a hydrogen atom or an alkyl group having from 1 to 6 carbon atoms, and each of the pairs of $R^1$ and $R^2$, and $R^3$ and $R^4$ may combine with each other to form a cyclic structure.

9. The chip solid electrolyte capacitor as claimed in claim 8, wherein the electrically conducting polymer containing a repeating unit represented by formula (1) is an electrically conducting polymer containing a structure unit represented by the following formula (3) as a repeating unit:

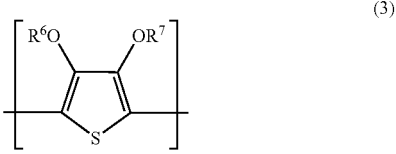

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen atoms when the alkyl groups are combined with each other at an arbitrary position, and the cyclic structure includes a structure having a vinylene bond which may be substituted, and a phenylene structure which may be substituted.

10. The chip solid electrolyte capacitor as claimed in claim 9, wherein the electrically conducting polymer is selected from polyaniline, polyoxyphenylene, polyphenylene sulfide, polythiophene, polyfuran, polypyrrole, polymethylpyrrole, and substitution derivatives and copolymers thereof.

11. The chip solid electrolyte capacitor as claimed in claim 10, wherein the electrically conducting polymer is poly(3,4-ethylenedioxythiophene).

12. The chip solid electrolyte capacitor as claimed in claim 7, wherein the inorganic semiconductor is at least one compound selected from molybdenum dioxide, tungsten dioxide, lead dioxide and manganese dioxide.

13. The chip solid electrolyte capacitor as claimed in claim 2, wherein the electrical conductivity of the semiconductor is from $10^{-2}$ to $10^3$ S/cm.

14. The chip solid electrolyte capacitor as claimed in claim 1, wherein the anode part comprises a distal end of the anode substrate.

15. The chip solid electrolyte capacitor as claimed in claim 1, wherein the anode part comprises a metal wire or foil connected to the sintered body.

16. The chip solid electrolyte capacitor as claimed in claim 15, wherein the metal wire is selected from tantalum, niobium, aluminum, titanium, alloys mainly comprising such a metal, and these metals and alloys which are partially oxidized and/or nitrided.

17. The chip solid electrolyte capacitor as claimed in claim 1, wherein the material for each of the anode and cathode terminals is selected from iron, copper, aluminum and alloys mainly comprising such a metal.

18. The chip solid electrolyte capacitor as claimed in claim 17, wherein each of the anode and cathode terminals differs in the material.

19. The chip solid electrolyte capacitor as claimed in claim 1, wherein each of the anode and cathode terminals is partially or entirely subjected to plating selected from solder, tin and titanium.

20. The chip solid electrolyte capacitor as claimed in claim 1, wherein the boundary between the anode part and the part excluding the anode part of the anode substrate is insulated by an insulating resin.

21. An electronic circuit using the chip solid electrolyte capacitor claimed in claim 1.

22. An electronic device using the chip solid electrolyte capacitor claimed in claim 1.

23. A method for producing a chip solid electrolyte capacitor in which a part of the anode part and a part of the cathode part of a capacitor element are connected to an anode terminal and a cathode terminal, respectively, and the capacitor element excluding only a part or the whole of respective bottom faces or bottom and side faces of the anode and cathode terminals is molded with a jacket and in which the connection face of the cathode terminal to the capacitor element is larger than the entire face of the capacitor element in the side connected to the cathode terminal, the method comprising providing a lead frame pair having bottom face parts working out to a part of the anode terminal and a part of the cathode terminal, laminating a metal material which constitutes the cathode terminal having an area larger than the cathode terminal-connected face of the capacitor element on the lead frame corresponding to the cathode terminal, and laminating a metal material which constitutes the anode terminal on the lead frame corresponding to the anode terminal, wherein the bottom face part of the cathode terminal and the bottom face part of the anode terminal have nearly the same size.

24. A method for producing a chip solid electrolyte capacitor in which a part of the anode part and a part of the cathode part of a capacitor element are connected to an anode terminal and a cathode terminal, respectively, and the capacitor element excluding only a part or the whole of respective bottom faces or bottom and side faces of the anode and cathode terminals is molded with a jacket and in which the connection face of the cathode terminal to the capacitor element is larger than the entire face of the capacitor element in the side connected to the cathode terminal and the bottom face parts of the cathode terminal and the anode terminal which are not jacket-molded have nearly the same size, the method comprising providing a lead frame pair having nearly the same bottom face parts working out to a part of the anode terminal and a part of the cathode terminal, laminating a metal material which constitutes the cathode terminal having an area larger than the cathode terminal-connected face of the capacitor element on the lead frame corresponding to the cathode terminal, and laminating a metal material constituting the anode terminal connected to the anode part of the capacitor element on the lead frame corresponding to the anode terminal, and wherein the bottom face art of the cathode terminal and the bottom face part of the anode terminal have nearly the same size.

* * * * *